UNITED STATES PATENT OFFICE.

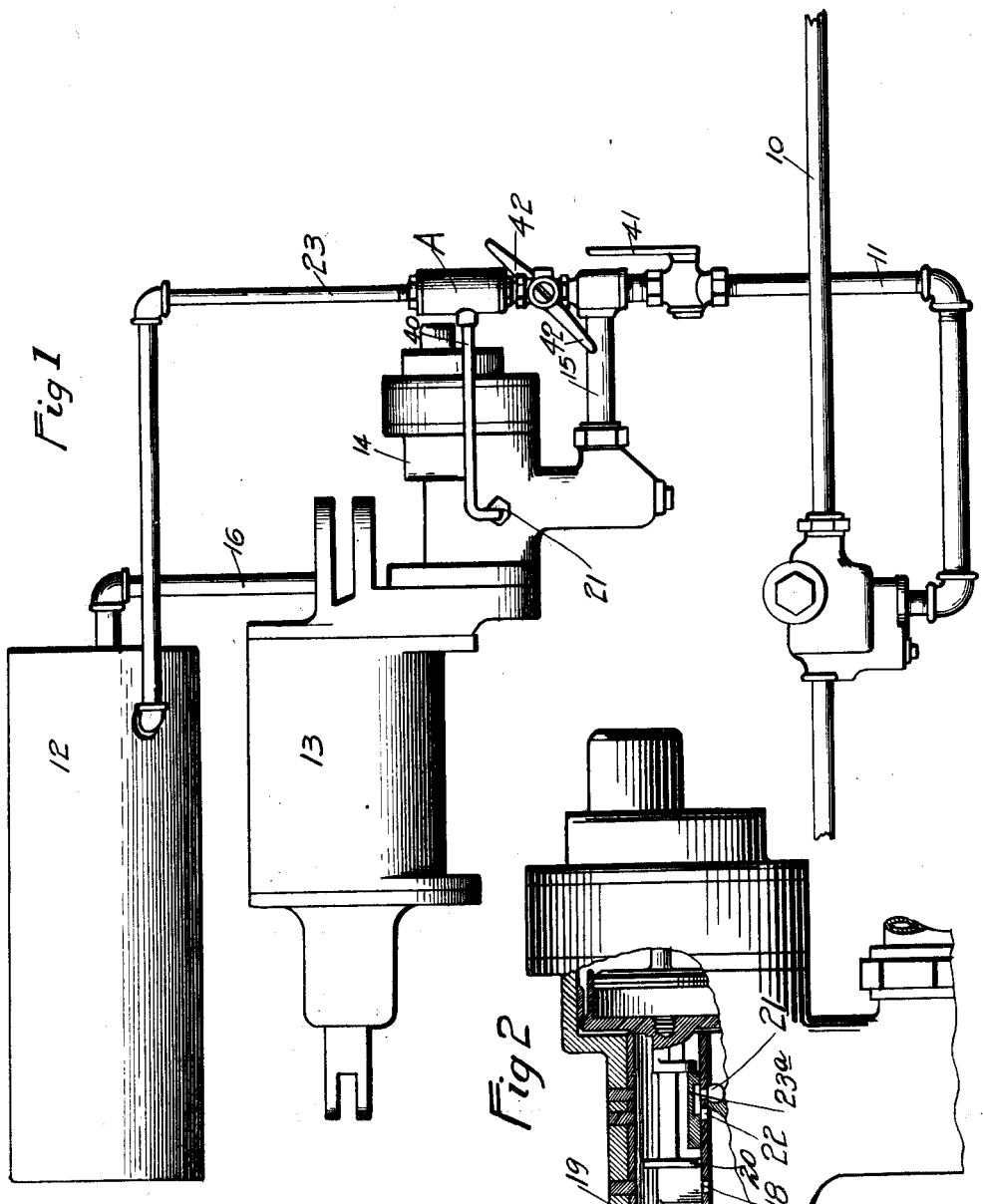

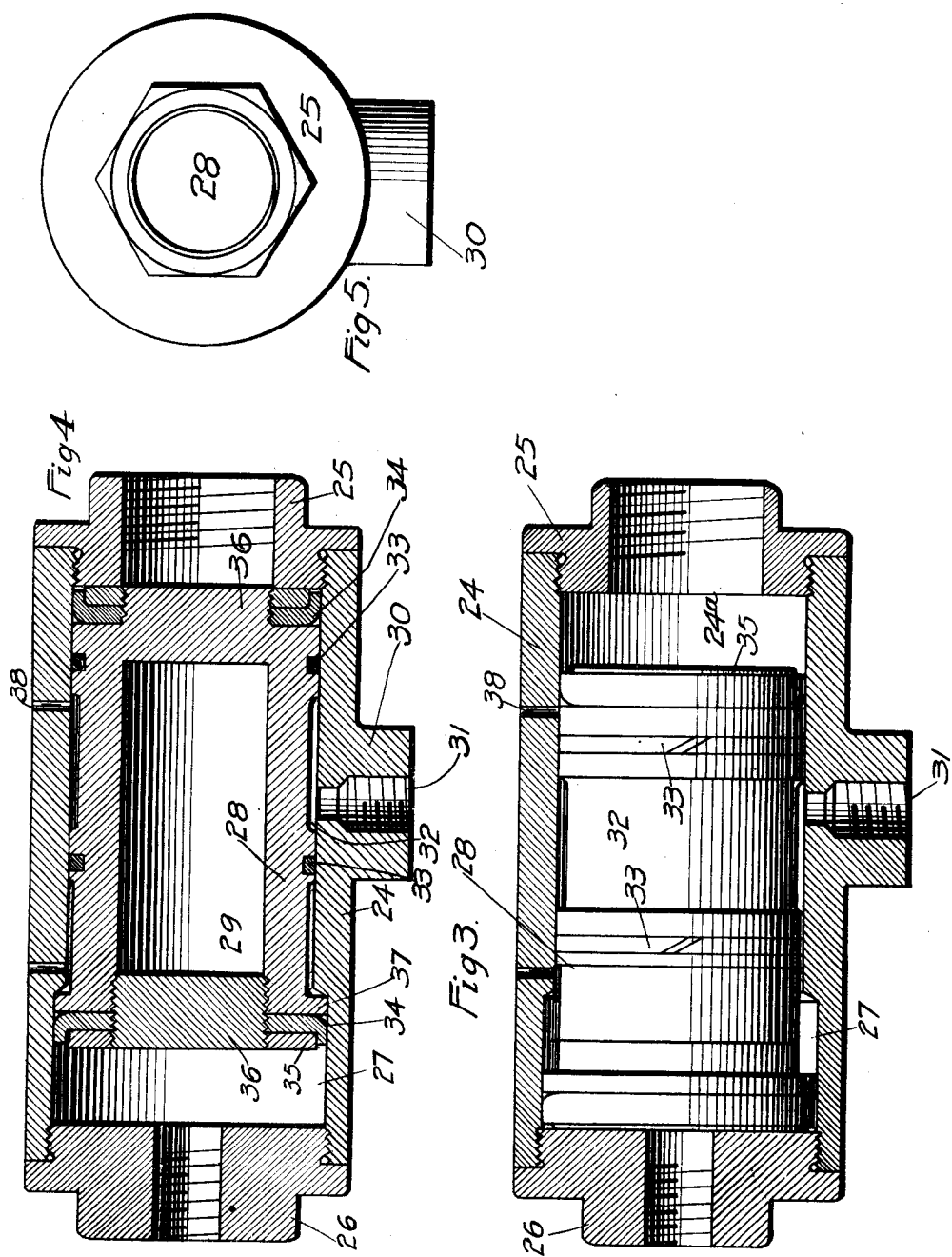

JOHN O. HARRISON, OF BOONE, IOWA, ASSIGNOR OF ONE-HALF TO JOSEPH C. FLANNERY, OF BOONE, IOWA.

AUTOMATIC RETAINER FOR AIR-BRAKES.

1,109,287.

Specification of Letters Patent. Patented Sept. 1, 1914.

Application filed January 2, 1914. Serial No. 810,088.

*To all whom it may concern:*

Be it known that I, JOHN O. HARRISON, a citizen of the United States, and resident of Boone, in the county of Boone and State of Iowa, have invented a certain new and useful Automatic Retainer for Air-Brakes, of which the following is a specification.

The object of my invention is to provide an automatic retainer for air brakes of simple, durable and inexpensive construction.

One of the difficulties with air brakes now in use is that when the brake is applied the pressure in the auxiliary tank is reduced and when the brake is released the air brake system for a short time, while the auxiliary tank is being recharged, is inoperative.

It is therefore my object to provide means whereby when the brake has been set in the ordinary way with an ordinary automatic air brake system, it may be held set until the auxiliary tank or reservoir is recharged.

A further object is to provide in an air brake system a valve subject to pressure from both train line and auxiliary reservoir and operated by said pressures for holding the air in the brake cylinder, after the brake is set and even after the "kick off", until the auxiliary reservoir is recharged, which valve is then moved to position for permitting the discharge of the air from the brake cylinder.

Still a further object is to provide an automatic retainer for air brakes which may be used in such a manner that the brakes may be thrown off at any time regardless of the speed of the train or the length thereof.

Still a further object is to provide such a device as above mentioned, constructed and adapted to be connected or used with the ordinary air brake systems.

My invention consists in certain details, in the construction, combination and arrangement of the various parts of my device whereby the objects contemplated are attained, as hereinafter more fully set forth, pointed out in my claims and illustrated in the accompanying drawings, in which:

Figure 1 shows a top or plan view of a portion of a train line, an auxiliary reservoir, brake cylinder, a triple valve casing and automatic retainer, embodying my invention. Fig. 2 shows a vertical, sectional view, through a portion of the triple valve case and the triple valve mechanism. Fig. 3 shows a horizontal, longitudinal, sectional view through my improved valve casing, showing the valve inclosed therein in its position for holding the air in the brake cylinder. Fig. 4 shows a horizontal, longitudinal, sectional view through said casing and also through the valve, showing the valve in position for permitting the escape of air from the brake cylinder, and Fig. 5 shows an end elevation of my improved valve and casing therefor.

My improved automatic retainer for air brakes is designed to be useful in connection with an ordinary air brake system, in which the parts are of well known construction.

In the accompanying drawings I have used the reference numeral 10 to indicate a section of an ordinary train line which it is understood may be connected with branch lines on a number of cars and also with the filling and controlling mechanism on an engine. Communicating with the train line or pipe 10 is a branch line or pipe 11.

The ordinary air brake systems employ the auxiliary tank or reservoir 12 and also the brake cylinder 13. Connected with the branch pipe 11, the brake cylinder and the auxiliary reservoir, is a triple valve 14, which is of ordinary construction and for that reason is only partially shown and described. Communicating with the lower part of the triple valve casing is a pipe 15, which also communicates with the pipe 11. By the term "triple valve" I mean the ordinary triple valve used in the Westinghouse and New York systems. Communicating with the triple valve system in the ordinary way and with the auxiliary reservoir 12 is a pipe 16. The reservoir 12 communicates with the brake cylinder 13 through the passage 17, the port 18, the interior 19 of the triple valve casing and the pipe 16. The port 18 is controlled by a valve 20. The triple valve casing is provided with an exhaust port 21 and also communicates with the passage 17 by means of a port 22. The ports 21 and 22 are controlled by a valve 23ª. These parts being of well known construction are described only generally and for the purpose of illustrating my invention. The pipe 23 communicates with the reservoir 12 and also with the pipe 11 at a point between the pipe 15 and said reservoir. In the pipe 23 is a valve, indicated in Fig. 1 by the reference character A, which will now be more fully described.

In Figs. 3 and 4 the reference numeral 24 indicates generally a hollow cylinder having a central longitudinal opening 24ª. The cylinder 24 is preferably provided with the ends 25 and 26 screwed into the cylinder. The end 25 is provided with an opening communicating with the interior of the cylinder 24 and with the pipe 11 and therethrough with the train line. The end 26 is provided with an opening communicating with the interior of the cylinder 24 and with the pipe 23. The opening in the interior of the cylinder 24 is somewhat enlarged at 27 for a short distance at the end adjacent to the end 26. Slidably mounted within the interior of the cylinder 24 is a valve 28 which is preferably in the form of a hollow cylinder closed at one end and provided with a screw-threaded plug 29 at the other end. Near the end 25 of the cylinder casing 24 is an extension 30 having an opening 31 through it which communicates with the interior of the cylinder casing 24. The valve 28 is provided on its outer surface with an annular groove 32 somewhat wider than the diameter of the opening 31 where the latter communicates with the interior of the casing 24. The valve 28 is provided on each side of the groove 32 with piston rings 33 of ordinary construction. At its ends the valve 28 is provided with leather packing rings 34 held in position by means of metal washers or rings 35, which are screwed onto the reduced ends 36 of the valve. The end of the valve 28 adjacent to the end 26 is provided with an enlarged annular rib or bead 37 of sufficient diameter to substantially fit the enlarged portion 27 of the valve casing. The size of the enlarged opening 27 in the valve casing permits a certain sliding movement of the valve 28 in the casing. When the rib 37 is at the limit of its movement toward the end 25, the opening 31 communicates with the space in the interior of the casing 24 around the reduced portion 32 of the valve, as shown in Fig. 4. The wall of the casing 24 is preferably provided with a plurality of openings 38 on the side opposite the extension 30, and preferably so located that when the valve is in the position last mentioned said openings 38 communicate with the space in the interior of the casing 24 around the reduced portion 32 of the valve. The reduced portion 32, the openings 38, and the opening 31 are so located that when the valve is at or near the limit of its movement toward the end 26 the reduced portion 32 passes the inner ends of the openings 38 and they are closed, as shown in Fig. 3.

Owing to the bead or rib 37 it will be noted that the total area of the end of the valve adjacent to the end 26 is greater than the total area of the end of the valve adjacent to the end 25. A pipe 40 communicates with the opening 31 and with the exhaust port 21, shown in Figs. 1 and 2. The controlling valves 41 and 42 are preferably provided in the branch pipe 11 on each side of the pipe 15. By means of the valve 41 the mechanism hereinbefore described may be cut off from the train line and by means of the valve 42 the brake retaining device A may be rendered inoperative.

I will now describe the practical operation of my improved automatic retainer for air brakes. In the ordinary air brake system, an air pressure is supplied through the train line until the pressure in the auxiliary reservoir 12 is, for example, seventy pounds and the pressure in the branch 11 is approximately the same. When the pressure is thus established the triple valve stands in position to leave the exhaust port 21 open and to close the port or means of communication between the auxiliary reservoir 12 and the brake cylinder 13. When the engineer desires to apply the brakes the air pressure in the train line and the branch 11 is reduced. By the reduction of said pressure the triple valve is so operated as to close the exhaust port 21 and to open communication between the auxiliary 12 and the brake cylinder 13. The result is that the compressed air in the auxiliary reservoir passes into the brake cylinder, thereby operating the brake controlling mechanism.

With the ordinary air brake systems, when it is desired to release the brakes the air in the train line is suddenly increased and the effect on the triple valve is to open the exhaust from the brake cylinder and to close communication between the brake cylinder and the auxiliary reservoir. When the triple valve is of any ordinary construction, the air passes from the train line to the auxiliary reservoir by means of a small leakage groove. It is usually therefore the fact that it takes some little time to recharge the auxiliary reservoir until the pressure therein is substantially equal to that in the train line. During the period required for such recharging it is impossible to set the brakes on account of the lack of pressure in the auxiliary reservoir. It will readily be seen that the impossibility of setting the brakes for a certain period after they have been released may oftentimes, and especially when the train is traveling down grade, cause serious trouble. Another difficulty experienced with air brakes in ordinary use is that where a very long train of more than twenty or thirty cars is being hauled, actual experience has shown that when the air in the train line is increased to throw off the brakes, the brakes are "kicked off" for not more than twenty or thirty cars back of the engine. A subsequent increase in the air in the train line will kick off the brakes on the rear cars. (This is due, probably, to practical forms of construction and is a particularly well known difficulty.) The danger of kicking off the brakes on the front cars only is readily seen. The brakes on the rear cars remaining set for a short time frequently results in breaking the train in two pieces or pulling out the end of the car. Both of the difficulties hereinbefore referred to, which are faced in the use of the ordinary air brakes, are avoided by the use of my brake retainer.

When it is desired to release the brakes and my device is in use, when the air in the train line is increased and the exhaust from the brake cylinders is opened, it should be kept in mind that the pressure in the auxiliary reservoir has been reduced and the pressure in the train line being greater at this time than the pressure in the auxiliary will hold the valve 28 at the limit of its movement nearest the auxiliary reservoir. When in this position the valve holds the opening 38 closed and prevents the exhaust of air from the brake cylinder. When the auxiliary becomes recharged, then owing to the fact that the face of the valve adjacent to the auxiliary is of greater area than the face of the valve adjacent to the train line, the valve is moved from its position shown in Fig. 3 to its position shown in Fig. 4, which is the limit of its movement toward the train line. When in the latter position the passage 38 communicates with the space in the interior of the valve casing around the groove 32 and the air escapes through said space and through the opening 38, relieving the pressure in the brake cylinder and releasing the brakes. By the time the auxiliary pressure reaches approximately the train line pressure, the brakes are released, and the device is in such condition that the brakes may be instantly set. This will entirely avoid the danger of a runaway train on the down grade and has the advantage of giving the engineer a far more complete control of his train than he would have under ordinary circumstances.

The use of my improved retainer avoids the second difficulty above mentioned in the following way. The valves 42 are preferably regulated to make my valves A operative on hills or with long trains. Otherwise my retainer may be used or not as desired. On a long train or at the top of a hill the retainers are turned on, on as many of the front cars as is necessary for holding the brakes on the front cars until the brakes on the rear cars are released.

Under the old system, where the train is running at comparatively low speed so that the cars have comparatively little momentum, and the train is long, it is necessary before releasing the brakes to stop the train to prevent breaking it in two. With my device this is entirely unnecessary, if a few retainers next to the engine, as determined by the judgment of the crew, are left on.

The advantages of my improved automatic retainer for air brakes are obvious from the foregoing description.

It will be understood that many changes may be made in the details of the construction of my device and particularly in the form and arrangement of the valves and it is my intention to cover by this application any such changes which may be included within the scope of the appended claims.

I claim as my invention:

1. In an air brake system having a train line, an auxiliary reservoir, a brake cylinder and a triple valve, a valve casing, a valve therein having ends of different diameters subject to the respective pressures of air in the auxiliary reservoir and the train line.

2. In an air brake system having a train line, an auxiliary reservoir, a brake cylinder and a triple valve, a hollow valve casing communicating at one end with the train line and at the other end with the auxiliary reservoir, and having an opening at a point between its ends, communicating with the brake cylinder, and having an exhaust opening, a valve in said casing having its end adjacent to the portion of the casing which communicates with the auxiliary reservoir, larger than its other end and having an annular groove so arranged that when the valve is in one position of its movement the exhaust opening is closed and when the valve is in another position of its movement said openings are in communication with the space in said casing around said groove.

Des Moines, Iowa, December 29, 1913.

JOHN O. HARRISON.

Witnesses:
L. ROBINSON,
M. WALLACE.